(12) United States Patent
Kawanami

(10) Patent No.: US 8,009,924 B2
(45) Date of Patent: Aug. 30, 2011

(54) METHOD AND APPARATUS FOR RECORDING IMAGE DATA

(75) Inventor: Naoto Kawanami, Tokyo (JP)

(73) Assignee: Hoya Corporation, Tokyo (JP)

( * ) Notice: Subject to any disclaimer, the term of this patent is extended or adjusted under 35 U.S.C. 154(b) by 1037 days.

(21) Appl. No.: 11/778,756

(22) Filed: Jul. 17, 2007

(65) Prior Publication Data

US 2008/0018746 A1    Jan. 24, 2008

(30) Foreign Application Priority Data

Jul. 19, 2006    (JP) ................................. 2006-196880

(51) Int. Cl.
| G06K 9/36 | (2006.01) |
| G06K 9/46 | (2006.01) |
| H04N 5/225 | (2006.01) |
| H04N 9/04 | (2006.01) |

(52) U.S. Cl. .................................. 382/244; 348/207.99
(58) Field of Classification Search .......... 382/244–247; 348/207.99
See application file for complete search history.

(56) References Cited

U.S. PATENT DOCUMENTS

| 5,444,554 A | * | 8/1995 | Muramatsu et al. | .......... 358/494 |
| 5,708,509 A | | 1/1998 | Abe | |
| 5,774,191 A | * | 6/1998 | Iverson | .......... 348/592 |
| 7,593,148 B2 | | 9/2009 | Ishikawa et al. | |
| 2002/0039143 A1 | * | 4/2002 | Sasaki | .......... 348/239 |
| 2004/0109059 A1 | * | 6/2004 | Kawakita | .......... 348/143 |
| 2004/0146215 A1 | * | 7/2004 | Hatanaka et al. | .......... 382/239 |
| 2005/0213812 A1 | | 9/2005 | Ishikawa et al. | |
| 2007/0041030 A1 | | 2/2007 | Kojima | |
| 2008/0170765 A1 | * | 7/2008 | D'sa et al. | .......... 382/128 |

FOREIGN PATENT DOCUMENTS

| JP | 6-334872 | | 12/1994 |
| JP | 8-107360 | | 4/1996 |
| JP | 10-257431 | | 9/1998 |
| JP | 2000-138837 | | 5/2000 |
| JP | 061067 | | 3/2001 |
| JP | 2002-94800 | | 3/2002 |
| JP | 2005159705 A | * | 6/2005 |
| JP | 2005-286415 | | 10/2005 |

OTHER PUBLICATIONS

Japan Office action, dated Oct. 26, 2010 along with an english translation thereof.
Japan Office action, dated Apr. 26, 2011 along with an english translation thereof.

* cited by examiner

*Primary Examiner* — Yubin Hung
(74) *Attorney, Agent, or Firm* — Greenblum & Bernstein, P.L.C.

(57) ABSTRACT

An apparatus for recording image data has an encoding processor that compresses original image data (for example, RAW data), having a plurality of pixels, in accordance with a lossless compression coding; and a recording processor that records the compressed image data or the original image data into a memory. If the size of the compressed image data is larger than that of the original image data, the recording processor records the original image data into the memory without carrying out a compression process.

9 Claims, 5 Drawing Sheets

METHOD AND APPARATUS FOR RECORDING IMAGE DATA

BACKGROUND OF THE INVENTION

1. Field of the Invention

The present invention relates to a digital camera, electronic equipment with a photographing function, and so on. In particular, it relates to a recording process of image data.

2. Description of the Related Art

In a digital camera, or a cellular phone with a photographing function, image data is encoded to decrease the amount of image data. High-quality image data, such as "RAW data", can be encoded or compressed and recorded in a memory in accordance with a lossless (compression) coding. Thus, the original image data can be completely reconstructed from the compressed image data without information loss. In the JPEG lossless coding, a spatial coding is applied, wherein a difference value between neighboring pixels is successively calculated in accordance with the DPCM (Differential Pulse Code Modulation) fashion, and the difference value is subjected to the Huffman-Coding.

In the case of lossless coding, the amount of data to be recorded increases significantly when compared to a lossy (compression) coding with information loss. To decrease the amount of compressed data, for example, a plurality of Huffman Tables is prepared and the image data is encoded in each Huffman Table. Then, the smallest amount of minimum encoded data is selected.

The lossless coding uses a predictive coding process wherein a sample pixel is predicted from neighboring pixels. This process is based on the condition or assumption that neighboring pixels have a high correlation with respect to pixel values. When a low correlation between neighboring pixels exists, such as a checkered-pattern image, the amount of compressed image data obtained by lossless coding is occasionally larger than that of original uncompressed image data.

On the other hand, when photographing, especially when carrying out a continuous shooting, shorting of the compression process and recording process is required to capture as many images as possible. However, the lossless coding cannot effectively shorten the time necessary for recording image data because of the large amount of data to be recorded.

SUMMARY OF THE INVENTION

An object of the present invention is to provide a digital camera and apparatus for recording an object image that is capable of securely suppressing the amount of image data to be recorded when compressing the image data using a lossless coding and effectively recording the image data during photographing or shooting.

An apparatus for recording image data according to the present invention has an encoding processor that compresses original image data (for example, RAW data) having a plurality of pixels in accordance with a lossless compression coding; and a recording processor. The recording processor selectively records the compressed original image data or the original image data into a memory. For example, the encoding processor carries out an entropy coding, or the encoding processor encodes a difference value between neighboring pixels. When a color filter having a plurality of color elements is provided on an image sensor, the recording processor encodes the difference value between neighboring pixels which are opposite elements of the same color. Then, if the size of the compressed image data is larger than that of the original image data, the recording processor records the original image data into the memory without carrying out a compression process.

The determination of whether the size of the compressed image data is larger than that of the original image data may be carried out by actually compressing the original image data. As an example, the apparatus has a first determiner that determines whether the size of the compressed image data that is obtained by actually compressing the original image data is larger than the size of the original image data or not. The recording processor records the actually compressed image data into the memory if the size of the compressed image data is not larger than that of the original image data. On the other hand, the recording processor records the original image data into the memory if the size of the compressed image data is larger than that of the original image data.

Alternatively, to improve the speed of the recording process, the size of the compressed data may be estimated or calculated before actually compressing the entire original image data. As an example, the apparatus has an extracting processor, a preliminary encoder, a calculator, and a second determiner. The extracting processor extracts a part of the original image data to form a partial image data set. The preliminary encoder encodes the partial image data in accordance with the lossless coding to generate partially-compressed image data. The calculator calculates the estimated size of the compressed image data, corresponding to the actual amount of compressed image data, from the size of the partially-compressed image data, on the basis of the correspondence relationship between the partial image data and the original image data. The second determiner determines whether the estimated size of the compressed image data is larger than the size of the original image data or not. The recording processor records the compressed image data into the memory if the estimated size of the compressed image data is not larger than that of the original image data, whereas the recording processor records the original image data into the memory if the estimated size of the compressed image data is larger than that of the original image data.

In this example, the calculator calculates the estimated size of the compressed image data on the basis of the image-size ratio of the partially-compressed image data and the original image data. To shorten the time taken to record image data, the extracting processor may divide the original image data into a plurality of blocks, and extracts a part of the blocks such that the extracted part of the blocks has a correlation relationship with the original image data. For example, the extracting processor carries out a down sampling on the basis of the plurality of blocks or a plurality of pixels.

A computer readable medium that stores a program for recording image data, according to the present invention, has an encoding code segment for compressing original image data having a plurality of pixels in accordance with a lossless compression coding; and a recording code segment code for recording compressed image data or the original image data into a memory. The recording code segment records the original image data into the memory without carrying out a compression process if the size of the compressed image data is larger than that of the original image data.

A method for recording image data includes: 1) compressing original image data having a plurality of pixels in accordance with a lossless compression coding; 2); determining whether the size of the compressed image data is larger than that of the original image data and 3) recording the original image data into the memory without carrying out a compression process when the size of the compressed image data is larger than that of the original image data.

A digital camera according to the present invention has an image sensor: an exposure controller that carries out a photographing action to form an object image on the image sensor; a signal processor that processes image-pixel signals from the image sensor to generate original image data having a plurality of pixels; an encoding processor that compresses the original image data in accordance with a lossless compression coding; and a recording processor that records the compressed image data or the original image data into a memory. The recording processor records the original image data into the memory without carrying out a compression process when the size of the compressed image data is larger than that of the original image data.

When the camera is capable of shooting continuously to obtain a series of captured images, to shorten the time taken by the recording process, the recording processor may record the original image data or the compressed image data regarding a first-captured image. Then, the recording processor records the remaining images so as to be similar to the firstly captured image.

BRIEF DESCRIPTION OF THE DRAWINGS

The present invention will be better understood from the description of the preferred embodiments of the invention set forth below together with the accompanying drawings, in which.

DESCRIPTION OF THE PREFERRED EMBODIMENTS

Hereinafter, the preferred embodiments of the present invention are described with reference to the attached drawings.

Figure 1:
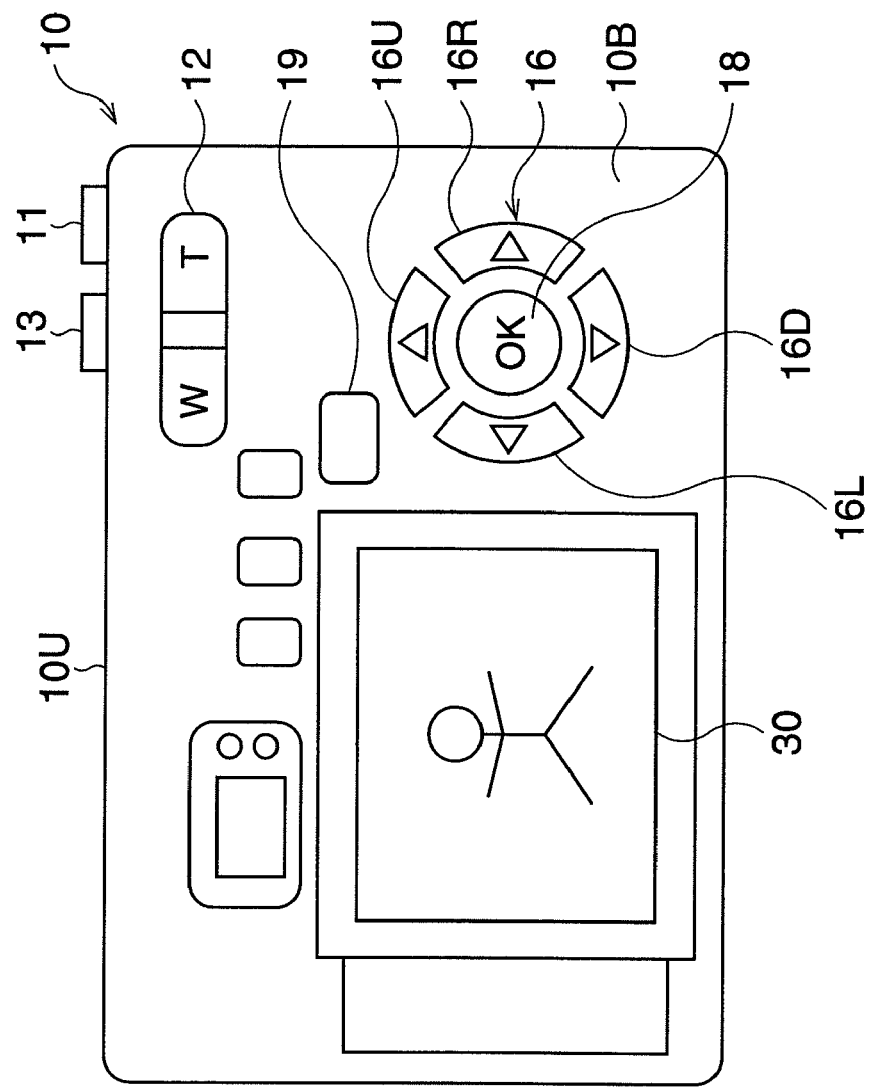
FIG. 1 is the rear view of a digital camera according to the first embodiment.

FIG. 1 is the rear view of a digital camera according to the first embodiment.

A digital camera 10 has an LCD monitor 30 on a back surface 10B, and a view finder 22 above the LCD monitor 30. Further, a series of buttons are provided on the back surface 10B. Herein, a zoom button 12; a cross-shaped button 16 composed of an up button 16U, a down button 16D, a right button 16R, and a left button 16L; an OK button 18; and a mode button 19, are provided. The mode button 19 is operated to switch between a plurality of modes including a photographing (shooting)-mode, a menu-mode, and a replay-mode.

A main button 11 and a release button 13 are provided on an upper surface 10U. The camera 10 is turned ON by depressing the main-button 11, and an object image is recorded by operating the release button 13. In a lens barrel (not shown) provided on a front surface of the camera 10, a photographing optical system (herein, not shown) is installed.

In the photographing-mode for selecting the type of shooting, a specific photographing-mode is selected by the cross-shaped button 16. Herein, a normal photographing mode or a continuous photographing mode is selected. Further, in the menu-mode, the compression mode is selected by the cross-shaped button 16. Herein, a lossless coding (lossless compression) or lossy coding, both of which are based upon the JPEG method, is selected.

Figure 2:
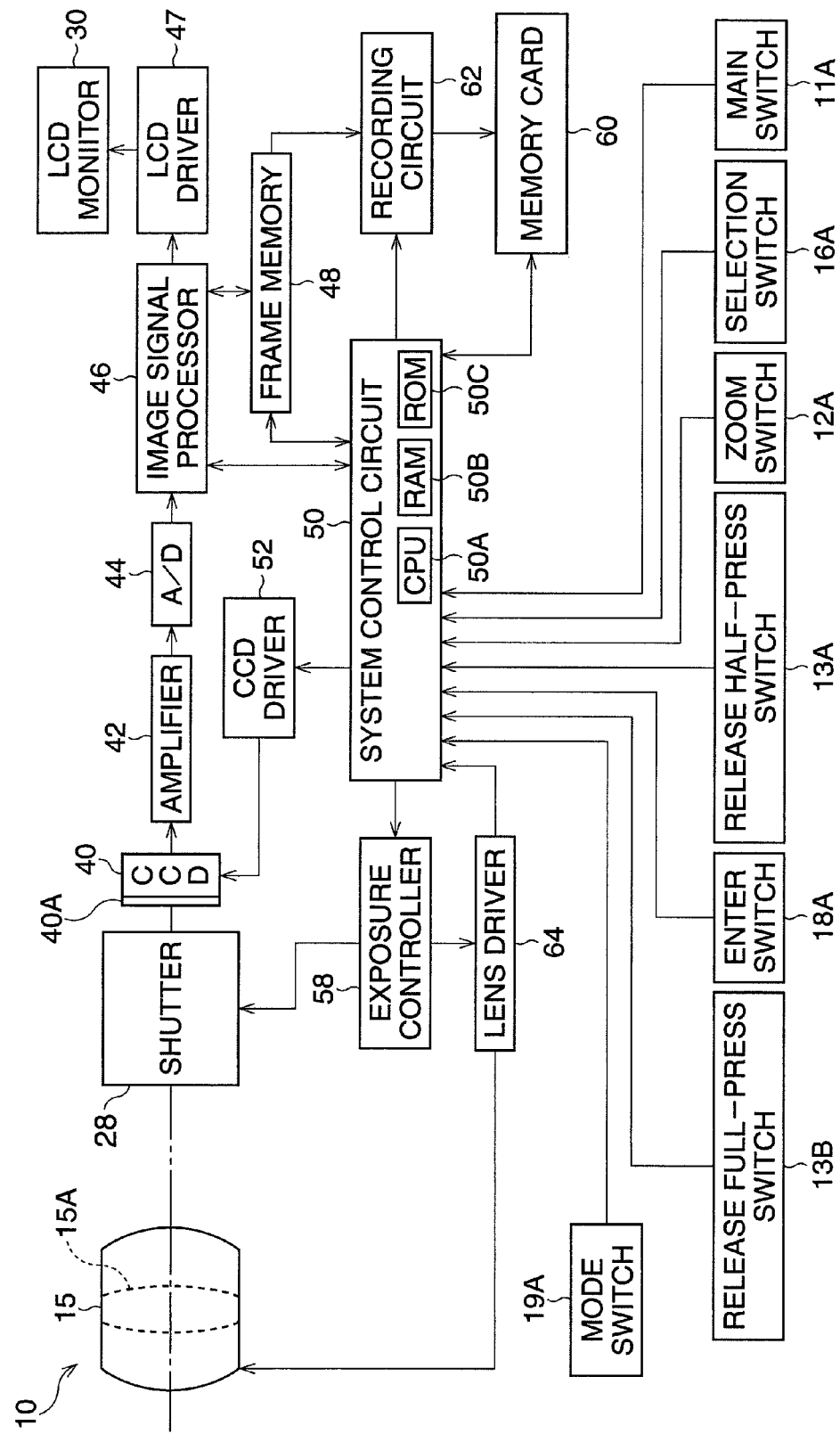
FIG. 2 is a block diagram of the digital camera.

FIG. 2 is a block diagram of the digital camera 10 according to the first embodiment.

A system control circuit 50 including a CPU 50A, a ROM 50B, and a RAM 50C, controls the operation of the camera 10, and a main switch 11A, a zoom switch 12A, a release half-press switch 13A, a release full-press switch 13B, a selection switch 16A, an enter switch 18A, and a mode switch 19A are connected to the system control circuit 50. In the ROM 50B, a program for controlling the performance of the camera 10 is stored.

When the normal photographing mode is selected by the mode button 19, a signal process for displaying a movie-image or video-image on the LCD monitor 30 is performed. An object image is formed on the light-receiving surface of the CCD 40 by light passing through the photographing optical system 15, and image-pixel signals corresponding to the object image are generated in the CCD 40.

In this embodiment, an on-chip color filter method using one color filter is applied. On the photo-sensor area of the CCD 40, a primary color filter 40A, checkered by three color elements, Red (R), Green (G), and Blue (B), is arranged such that each area of the three color elements is opposite a pixel. Therefore, the image-pixel signals read from the CCD 40 are composed of R, G, and B color signal components.

The CCD 40 is driven by a CCD driver 52 whereby the image-pixel signals are successively read from the CCD 40 at constant intervals. Herein, the image-pixel signals are read from the CCD 40 at 1/30 or 1/60 second intervals. The image-pixel signals are amplified in an amplifier 42, and are converted from analog signals to digital signals in an A/D converter 44.

In an image signal processor 46, various processes, such as a white balance and a gamma correcting process, are performed on the digital image signals. The processed image signals are temporarily stored in a frame memory 48, and are fed to an LCD driver 47. The LCD driver drives the LCD monitor 30 on the basis of the image signals, so that a movie-image is displayed on the LCD monitor 30. Further, luminance signals are successively generated from the image signals in the signal processor 46, and are fed to the system control circuit 50.

When the release button 13 is depressed halfway, the release half-press switch 13A is turned ON. Consequently, the auto-focusing is performed, and an exposure value is detected. A focusing lens 15A, which is included in the photographing optical system 15 and is driven by a lens driver 64, shifts along an optical axis E such that the image-forming surface coincides with the light-receiving surface of the CCD 40. An exposure controller 58 controls the position of the focusing lens 15A on the basis of control signals from the system control circuit 50.

When the release button 13 is depressed fully, the release full-press switch 13B is turned ON, so that a shutter 28 opens for a given interval. The shutter 28 is controlled by the exposure controller 58. One frame's-worth of image-pixel signals are read from the CCD 40, and are subjected to various processes in the amplifier 42, the A/D converter 44, and the signal processor 46. Then, the image data is compressed in a recording circuit 62, and the compressed image data is stored into a memory card 60.

When lossless coding is selected, image-pixel signals read from the CCD 40 are not subjected to a mixture process, but RAW data having a plurality of pixels, each of which has a particular pixel value separately, is generated and fed to the recording circuit 62. Then, in the recording circuit 62, as described later, the RAW data is subjected to the Huffman coding to generate compressed image data, or the RAW data is directly stored into the memory card 60 without being subjected to the Huffman coding. The system control circuit 50 detects the size of the compressed image data (data size), and controls the image signal processor 46, the frame memory 48, the memory card 60, and the recording circuit 62.

In the playback mode, the compressed data is read from the memory card 60, and is subjected to a decompression process. The decompressed image data is fed to the LCD driver 47, and the LCD driver 47 drives the LCD monitor 30 so that the recorded object image is displayed on the LCD monitor 30.

In the continuous photographing mode, the system control circuit 50 outputs control signals to the lens driver 64 and the exposure controller 58 to carry out a continuous shooting action that captures a series of images repeatedly at a short interval (for example, at 0.3 sec intervals). Accordingly, one frame's worth of image data is successively stored in the memory card 60.

Figure 3:
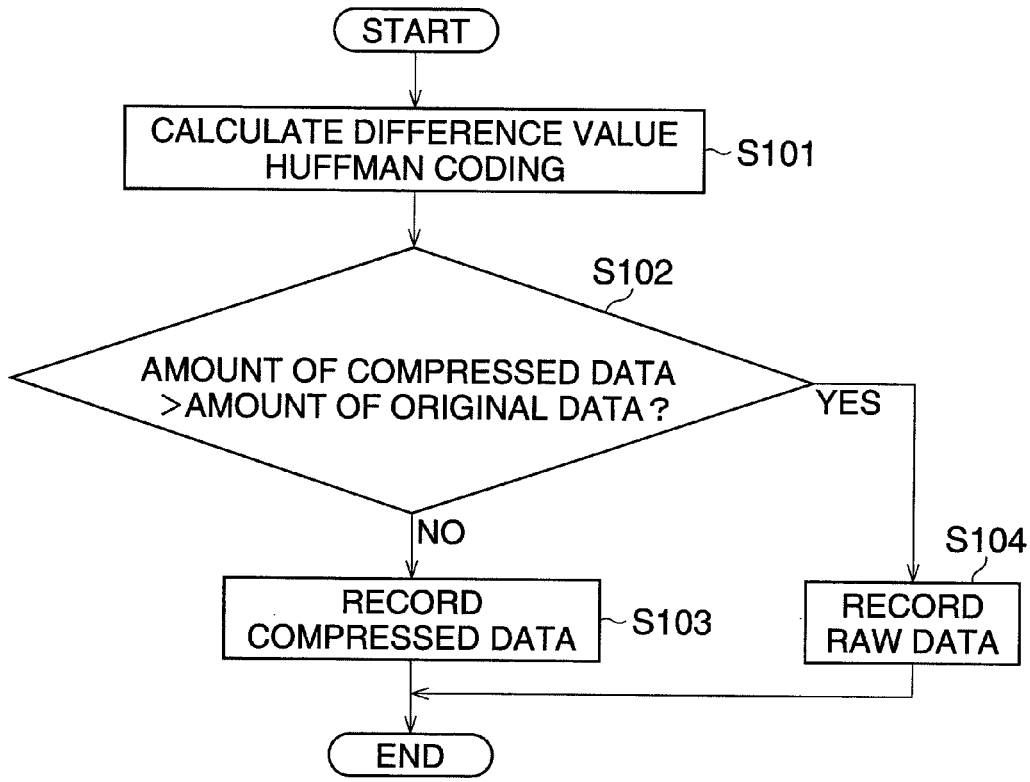
FIG. 3 is a flowchart of the recording process performed by a system control circuit.
Figure 4:
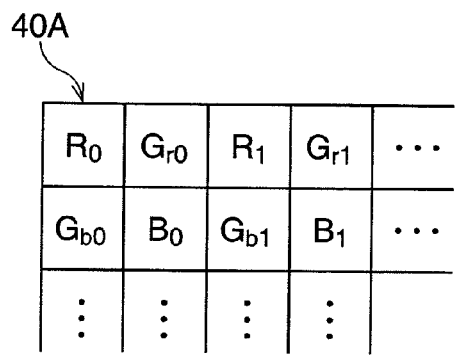
FIG. 4 is a view showing the array of a color filter.

FIG. 3 is a flowchart of the recording process performed by the system control circuit 50. FIG. 4 is a view showing the array of pixel data corresponding to an array of the color filter 40A. Herein, the original RAW data or the compressed RAW data is selectively recorded.

In Step S101, a difference value of the RAW data is successively calculated in accordance with the DPCM coding, and the difference value is Huffman-encoded based on a predetermined Huffman table. In the case of the array of the color filter 40A illustrated in FIG. 4, a difference value is successively calculated along the horizontal direction for each color element. As shown in the following equation, the difference value represents the difference value between pixels opposite elements of the same color, namely, between a given pixel opposite an element of a given color, and a procedure pixel, which is separated from the given pixel by two pixels, and is opposite an element of the same color:

$$DR_m = R_m - R_{m+1}$$

$$DG_{bm} = G_{bm} - G_{bm+1}$$

$$DG_{rm} = G_{rm} - G_{rm+1}$$

$$DB_m = B_m - B_{m+1} \quad (1)$$

The Huffman Table used herein (not shown) is a standard Huffman Table. Each difference value is converted to a corresponding Huffman code in accordance with the Huffman Table. Then, the Huffman code and additional information, which are respectively represented by a higher-rank bit and lower-rank bit, are combined so that the encoded data, namely, compressed image data based on the lossless coding is generated. The RAW data is herein 12 bit data, and the encoded data is represented by variable length bits in a range of 1 to 24 bits.

In Step S102, it is determined whether the size of the compressed image data is larger than that of the original uncompressed image data, namely, RAW data. The size of the original image data (data size) is predetermined based on the number of pixels on the CCD 40. On the other hand, the size of the compressed image data is calculated by detecting the size of the encoded data.

If it is determined that the size of the compressed image data is larger than that of the original uncompressed image data, the process goes to Step S104. In Step S104, the compressed image data is not recorded into the memory card 60. Instead, the original image data or the RAW data is read from the frame memory 48, and is recorded into the memory card 60 by the system control circuit 50. On the other hand, when it is determined that the size of the compressed image data is not larger than that of the original uncompressed image data, the process goes to Step S103, wherein the compressed image data, namely, the compressed RAW data is recorded into the memory card 60.

In Step S103 or S104, in addition to the recording of the image data, information data that indicates whether the compressed image data has been recorded or not, is recorded into the memory card 60 in conjunction with the compressed image data. Based on this information, the recorded image data is expanded and replayed during play-back mode.

In the case of the continuous photographing mode; firstly, it is determined whether the compression process has been carried out, based on a first-captured image. Then, the series of RAW data following the first captured image is recorded based on the recording method of the first captured image. Namely, if the first captured image is compressed, the remaining captured images are also compressed.

In this way, in the first embodiment, the RAW data is directly recorded into the memory card 60 without lossless coding when the size of the compressed RAW data is larger than that of the original RAW data. Thus, the size of recorded data can be decreased so that the recording process can be carried out more rapidly.

Figure 5:
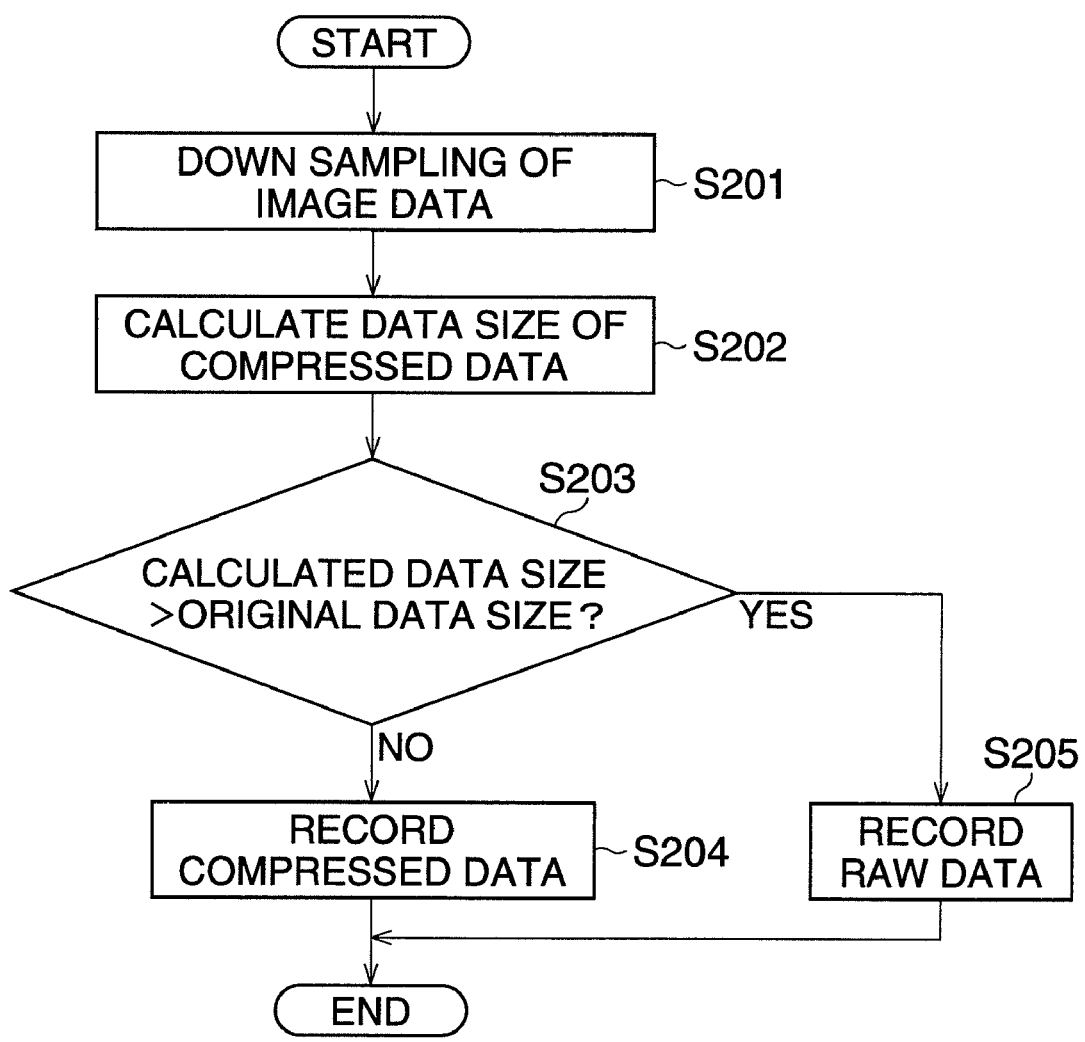
FIG. 5 is a view showing the recording process according to the second embodiment.
Figure 6:
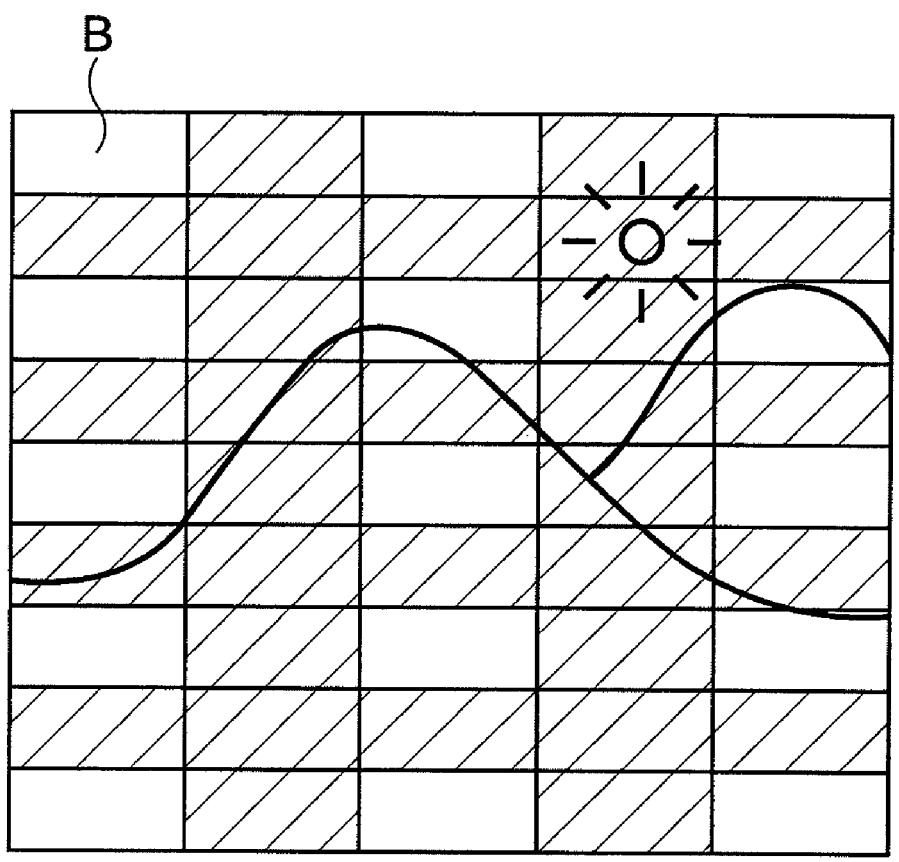
FIG. 6 is a view showing an image divided into a plurality of blocks.

With reference to FIGS. 5 and 6, the second embodiment is explained. The second embodiment is different from the first embodiment in that the size of the compressed image data is predicted or estimated by utilizing a part of the image data. Other constructions are substantially similar to those of the first embodiment.

FIG. 5 is a flowchart showing the recording process according to the second embodiment. FIG. 6 is a view showing an image divided into a plurality of blocks.

In Step S201, a part of the original image data (RAW data), which is subjected to the recording process, is extracted. The image shown in FIG. 6 is divided into the plurality of blocks B, each block being composed of a plurality of predetermined pixels. Herein, a down sampling process is carried out on the basis of each block B, wherein blocks are extracted alternately in the horizontal and vertical directions, respectively. Thus, one out of two blocks among the horizontally-arrayed blocks, and one out of two blocks among the vertically-arrayed blocks, are extracted. In FIG. 6, the extracted blocks are represented by a slash. The part of image data to be extracted is read from the frame memory 48, and is fed to the recording circuit 62.

In Step S202, the Huffman coding is carried out on the extracted partial image data so that encoded data is generated (hereinafter, called "partially-compressed image data). Based on the partially-compressed image data, the size of the compressed data obtained when compressing original RAW data is estimated. Namely, the number of pixels of the extracted image data is herein a quarter of the number of pixels of the original image data (see FIG. 6); in other words, the partially-extracted image data has a data size of ¼ of that of the original image data. Therefore, four times the size of the partially compressed image data is regarded as the size of the compressed image data (hereinafter, called the "estimated size of the compressed image data), which corresponds to the entire original image data.

In Step S203, it is determined whether the estimated size of the compressed image data is larger than that of the original image data. If it is determined that the estimated size of the compressed image data is larger than that of the original image data, the process goes to Step S205. In Step S205, the original image data is fed to the system control circuit 50 as RAW data and is directly recorded into the memory card 60. On the other hand, if it is determined that the estimated size of the compressed image data is not larger than that of the original image data, the process goes to Step S204, wherein the original image data is compressed by the Huffman coding in the recording circuit 62, and the Huffman-coded data is recorded into the memory card 60.

In this way, in the second embodiment, the size of the compressed image data is estimated or calculated by utilizing the part of the RAW data, and the RAW data is not compressed, but directly recorded when the estimated size of the compressed image data is larger than that of the RAW data. Thus, the speed of the recording process is improved so that the recording process can be performed for a short time even when a CCD having a large number of pixels (for example, some million to some ten million pixels) is provided in a digital camera.

For the extraction of image data, a down sampling based on the pixels or an extraction of a part of the original image data may be performed instead of the down sampling based on the blocks. In this case, the part of the image data may be extracted such that the extracted portion has a correlation with the original image data.

For the compression process, an entropy coding other than the Huffman coding may be utilized, or an arithmetic coding may be utilized. Further, optional coding methods other than the JPEG lossless coding may be also applied. The image data may be recorded in an optional memory instead of a memory card.

Note that, in Step S102 or S203, the comparison of data size may be based on a part of the image data instead of the entire image data. In the continuous photographing mode, the comparison of data size may be performed in each captured image. In this case, the rate or degree of down sampling may be changed in accordance with the recording method (compression process or non-compression process) of the previous image.

Other image data to be compressed may be optionally set instead of the RAW data, and the construction of the color filter may be optionally selected (for example, a complementary color filter). Further, a movie-camera or a cellular phone with a camera may be disposed instead of the digital camera, and data transmission architecture used in a network system such as internet may be also applied. In this case, the original image data or compressed image data is temporarily stored into a memory provided in a computer, and is transmitted to another computer via the network.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2006-196880 (filed on Jul. 19, 2006), which is expressly incorporated herein by reference, in its entirety.

The invention claimed is:

1. A method for recording image data captured by an image capturing apparatus, the method comprising:
    compressing original image data, having a plurality of pixels, in accordance with a lossless compression coding;
    determining whether an estimated size of compressed image data for an image is larger than the size of original image data for the image; and
    recording the original image data for the image into a memory without carrying out a compression process if the estimated size of the compressed image data for the image is larger than that of the original image data for the image, and recording the compressed image data for the image into the memory if the estimated size of the compressed image data for the image is not larger than that of the original image data for the image;
    dividing the original image data for the image into a plurality of blocks;
    extracting a part of the blocks to form a partial image data such that the extracted part of the blocks has a correlation relationship relative to the original image data for the image,
    performing a down sampling on the basis of the plurality of blocks;
    encoding the partial image data in accordance with the lossless compression coding to generate partially-compressed image data; and
    calculating the estimated size of the compressed image data for the image from the size of the partially-compressed image data on the basis of the correspondence relationship between the partial image data and the original image data for the image
    wherein the image capturing apparatus is capable of shooting continuously to obtain a series of captured images, the recording comprising recording the original image data or the compressed image data for the series of captured images based on a first-captured image of the series of captures images, and recording the remaining images in the same image data type used to record the first-captured image.

2. An apparatus for recording image data captured by an image capturing apparatus, comprising:
    an encoding processor that compresses original image data having a plurality of pixels in accordance with a lossless compression coding;
    a determiner that determines whether an estimated size of compressed image data for an image is larger than the size of original image data for the image; and
    a recording processor that records the compressed image data for the image or the original image data for the image into a memory, said recording processor recording the original image data for the image into said memory without carrying out a compression process if the estimated size of the compressed image data for the image is larger than that of the original image data for the image, and said recording processor recording the compressed image data for the image into said memory if the estimated size of the compressed image data for the image is not larger than that of the original image data for the image;
    an extracting processor that divides the original image data for the image into a plurality of blocks, extracts a part of the blocks to form a partial image data such that the extracted part of the blocks has a correlation relationship relative to the original image data for the image, and performs a down sampling on the basis of the plurality of blocks;
    a preliminary encoder that encodes the partial image data in accordance with the lossless compression coding to generate partially-compressed image data; and
    a calculator that calculates the estimated size of the compressed image data for the image from the size of the partially-compressed image data on the basis of the correspondence relationship between the partial image data and the original image data for the image wherein the image capturing apparatus is capable of shooting continuously to obtain a series of captured images, said recording processor recording the original image data or the compressed image data for the series of captured images based on a first-captured image of the series of captures images, said recording processor recording the remaining images in the same image data type used to record the first-captured image.

3. The apparatus of claim 2,
wherein said calculator calculates the estimated size of compressed image data for the image on the basis of the image-size ratio of the partially-compressed image data and the original image data for the image.

4. The apparatus of claim 2,
wherein said encoding processor carries out an entropy coding.

5. The apparatus of claim 2,
wherein said encoding processor encodes a difference value between neighboring pixels.

6. The apparatus of claim 2,
wherein a color filter, having a plurality of color element, is provided on an image sensor, said recording processor encodes a difference value between neighboring pixels, which are opposite elements of the same color.

7. A digital camera, comprising:
an image sensor;
an exposure controller that carries out a photographing action to form an object image on said image sensor;
a signal processor that processes image-pixel signals from said image sensor to generate original image data having a plurality of pixels;
an encoding processor that compresses original image data in accordance with a lossless compression coding; a determiner that determines whether an estimated size of compressed image data for an image is larger than the size of original image data for the image; and
a recording processor that records the compressed image data for the image or the original image data for the image into a memory, said recording processor recording the original image data for the image into said memory without carrying out a compression process if the estimated size of the compressed image data for the image is larger than that of the original image data for the image, said recording processor recording the compressed image data for the image into said memory if the estimated size of the compressed image data for the image is not larger than that of the original image data for the image;
an extracting processor that divides the original image data for the image into a plurality of blocks, extracts a part of the blocks to form a partial image data such that the extracted part of the blocks has a correlation relationship relative to the original image data for the image, and performs a down sampling on the basis of the plurality of blocks;
a preliminary encoder that encodes the partial image data in accordance with the lossless compression coding to generate partially-compressed image data;
a calculator that calculates the estimated size of the compressed image data for the image from the size of the partially-compressed image data on the basis of the correspondence relationship between the partial image data and the original image data for the image
wherein said camera is capable of shooting continuously to obtain a series of captured images, said recording processor recording the original image data or the compressed image data for the series of captured images based on a first-captured image of the series of captures images, said recording processor recording the remaining images in the same image data type used to record the first-captured image.

8. A digital camera, comprising:
an image sensor;
an exposure controller that carries out a photographing action to form an object image on said image sensor;
a signal processor that processes image-pixel signals from said image sensor to generate original image data having a plurality of pixels;
an encoding processor that compresses the original image data in accordance with a lossless compression coding; and
a recording processor that records the compressed image data or the original image data into a memory, said recording processor recording the original image data into said memory without carrying out a compression process if an estimated size of the compressed image data is larger than that of the original image data,
wherein said camera is capable of shooting continuously to obtain a series of captured images, said recording processor recording the original image data or the compressed image data for the series of captures images based on a first-captured image of the series of captured images, said recording processor recording the remaining images in the same image data type used to record the first-captured image.

9. A computer readable medium that stores a program for recording image data captured by an image capturing apparatus, comprising:
an encoding code segment for compressing original image data having a plurality of pixels in accordance with a lossless compression coding; and
a determining code segment that determines whether an estimated size of compressed image data for an image is larger than the size of original image data for the image;
a recording code segment for recording the compressed image data for the image or the original image data for the image into a memory, said recording code segment recording the original image data for the image into said memory without a compression process if the estimated size of the compressed image data for the image is larger than that of the original image data for the image, and said recording code segment recording the compressed image data for the image if the estimated size of the compressed image data for the image is not larger than that of the original image data for the image;
a dividing code segment for dividing the original image data for the image into a plurality of blocks,
an extracting code segment for extracting a part of the blocks to form a partial image data such that the extracted part of the blocks has a correlation relationship relative to the original image data for the image,
a down sampling code segment for performing a down sampling on the basis of the plurality of blocks;
an encoding code segment for preliminarily encoding the partial image data in accordance with the lossless compression coding to generate partially-compressed image data; and
a calculating code segment for calculating the estimated size of the compressed image data for the image, corresponding to the actual amount of compressed image data for the image, from the size of the partially-compressed image data on the basis of the correspondence relationship between the partial image data and the original image data for the image wherein the image capturing apparatus is capable of shooting continuously to obtain a series of captured images, the recording code segment recording the original image data or the compressed image data for the series of captured images based on a first-captured image of the series of captures images, the recording code segment recording the remaining images in the same image data type used to record the first-captured image.

* * * * *